US011137652B2

(12) United States Patent
Gong et al.

(10) Patent No.: US 11,137,652 B2
(45) Date of Patent: Oct. 5, 2021

(54) ARRAY SUBSTRATE AND FABRICATION METHOD THEREOF, AND DISPLAY DEVICE

(71) Applicants: BOE TECHNOLOGY GROUP CO., LTD., Beijing (CN); HEFEI BOE OPTOELECTRONICS TECHNOLOGY CO., LTD., Anhui (CN)

(72) Inventors: Kui Gong, Beijing (CN); Xianxue Duan, Beijing (CN); Dezhi Xu, Beijing (CN)

(73) Assignees: BOE TECHNOLOGY GROUP CO., LTD., Beijing (CN); HEFEI BOE OPTOELECTRONICS TECHNOLOGY CO., LTD., Anhui (CN)

(*) Notice: Subject to any disclaimer, the term of this patent is extended or adjusted under 35 U.S.C. 154(b) by 383 days.

(21) Appl. No.: 15/769,591

(22) PCT Filed: Oct. 19, 2017

(86) PCT No.: PCT/CN2017/106916
§ 371 (c)(1),
(2) Date: Apr. 19, 2018

(87) PCT Pub. No.: WO2018/176809
PCT Pub. Date: Oct. 4, 2018

(65) Prior Publication Data
US 2020/0257175 A1    Aug. 13, 2020

(30) Foreign Application Priority Data

Mar. 27, 2017    (CN) .......................... 201710188823.5

(51) Int. Cl.
*G02F 1/1362*    (2006.01)
*G02F 1/1343*    (2006.01)

(52) U.S. Cl.
CPC .. *G02F 1/136286* (2013.01); *G02F 1/134309* (2013.01); *G02F 1/134318* (2021.01); *G02F 2201/121* (2013.01)

(58) Field of Classification Search
CPC ......... G02F 1/136286; G02F 1/134309; G02F 1/13439; G02F 1/134336;
(Continued)

(56) References Cited

U.S. PATENT DOCUMENTS 8,988,644 B2    3/2015  Lee
9,817,290 B2    11/2017 Hao et al.
(Continued)

FOREIGN PATENT DOCUMENTS

CN    101847639 A    9/2010
CN    104267552 A    1/2015
(Continued)

OTHER PUBLICATIONS

International Search Report and Written Opinion dated Jan. 19, 2018; PCT/CN2017/106916.

*Primary Examiner* — Angela K Davison

(57) ABSTRACT

An array substrate and a fabrication method thereof, and a display device are provided. In the array substrate the pixel units includes common electrode, and the common electrodes of adjacent pixel units in the column direction is electrically connected through a first connection portion; the first signal line is located between the adjacent pixel units in the column direction. A total area of the first connection portion between the common electrodes of every two of the pixel units overlapping with the first signal line is a first overlapping area, at least one end of the first signal line is a first signal input end, and the first overlapping areas decrease as minimum distances from the first connection portions to the first signal input end increase in the row direction.

11 Claims, 5 Drawing Sheets

(58) Field of Classification Search
CPC .......... G02F 2001/134318; G02F 2001/13606; G02F 2201/121; G09G 2300/0426; G06F 3/0445; G06F 3/0448
See application file for complete search history.

(56) References Cited

U.S. PATENT DOCUMENTS

2006/0197726 A1* 9/2006 Wu ................... G09G 3/3648
345/87
2017/0010510 A1* 1/2017 Hao ................... H01L 27/124

FOREIGN PATENT DOCUMENTS

| CN | 104914639 | * | 9/2015 | ........... G02F 1/1362 |
| CN | 104914639 A | | 9/2015 | |
| CN | 105911786 A | | 8/2016 | |
| CN | 106681076 A | | 5/2017 | |

* cited by examiner

ARRAY SUBSTRATE AND FABRICATION METHOD THEREOF, AND DISPLAY DEVICE

The present application claims priority of Chinese Patent Application No. 201710188823.5 filed on Mar. 27, 2017, the disclosure of which is incorporated herein by reference in its entirety as part of the present application.

TECHNICAL FIELD

At least one embodiment of the present disclosure relates to an array substrate and a fabrication method thereof, and a display device.

BACKGROUND

A liquid crystal display panel has advantages such as excellent color performance, large viewing angle, and high contrast, so it has a broad market prospect. The liquid crystal display panel usually displays as driven by data drivers and scan drivers located around it. Scanning signals of one scanning line are respectively input by the scan drivers connected with both ends of the scanning line, to control turning-on of a thin film transistor (TFT) connected with the scanning line, so that the data drivers can input voltage signals required for displaying picture into a pixel electrode of the liquid crystal display panel through the thin film transistor, so as to implement display of the liquid crystal display panel.

SUMMARY

At least one embodiment of the present disclosure provides array substrate, including: a base substrate; a plurality of pixel units, arranged in a matrix in a row direction and a column direction; each of the pixel units including a common electrode, and the common electrodes of adjacent pixel units in the column direction being electrically connected through a first connection portion; a first signal line, located on the base substrate and extending in the row direction, and located between the adjacent pixel units in the column direction, the first connection portion and the first signal line at least partially overlapping with each other, wherein, a total area of the first connection portion between the common electrodes of every two of the pixel units overlapping with the first signal line is a first overlapping area, at least one end of the first signal line is a first signal input end, and the first overlapping areas decrease as minimum distances from the first connection portions to the first signal input end increase in the row direction.

For example, the first overlapping area is inversely proportional to the minimum distance from the first connection portion to the first signal input end in the row direction.

For example, the array substrate further includes a second signal line, located on the base substrate and extending in the column direction, and located between the adjacent pixel units in the row direction; a second connection portion, configured to connect the common electrodes of adjacent pixel units in the row direction, the second connection portion and the second signal line at least partially overlapping with each other, wherein, a total area of the second connection portion between the common electrodes of every two of the pixel units overlapping with the second signal line is a second overlapping area, at least one end of the second signal line is a second signal input end, and the second overlapping areas decrease as minimum distances of the second connection portions to the second signal input end increase in the column direction.

For example, one of the first signal line and the second signal line is a gate line, and the other is a data line.

For example, a material of the common electrode is the same as a material of at least one of the first connection portion or the second connection portion.

For example, at least one of the first connection portion or the second connection portion between the common electrodes of at least one pair of pixel units includes a plurality of sub-connection portions.

For example, in the column direction, the second overlapping area is inversely proportional to the minimum distance of the second connection portion to the second signal input end.

At least one embodiment of the present disclosure provides a fabrication method of an array substrate, including: defining a plurality of pixel units on a base substrate, the plurality of pixel units being arranged in a matrix in a row direction and a column direction, and each of the pixel units including a common electrode; forming a first connection portion between the common electrodes of adjacent pixel units in the column direction to connect the common electrodes of the adjacent pixel units; forming a first signal line extending in the row direction on the base substrate, and the first signal line being between the adjacent pixel units in the column direction, the first connection portion and the first signal line at least partially overlapping with each other, wherein, a total area of the first connection portion between the common electrodes of every two of the pixel units overlapping with the first signal line is a first overlapping area, at least one end of the first signal line is a first signal input end, and the first overlapping areas decrease as minimum distances from the first connection portions to the first signal input end increase in the row direction.

For example, the fabrication method of the array substrate further includes: forming a second signal line extending in the column direction on the base substrate, and forming the second signal line between the adjacent pixel units in the row direction; forming a second connection portion between common electrodes of the adjacent pixel units in the row direction to connect the common electrodes of the adjacent pixel units, the second connection portion and the second signal line at least partially overlapping with each other, wherein, a total area of the second connection portion between common electrodes of every two of the pixel units overlapping with the second signal line is a second overlapping area, at least one end of the second signal line is a second signal input end, and the second overlapping areas decrease as minimum distances of the second connection portions to the second signal input end increase in the column direction.

For example, at least one of the first connection portion or the second connection portion is formed with the common electrodes by one patterning process.

At least one embodiment of the present disclosure provides a display device, including the array substrate of the embodiments of the present disclosure.

BRIEF DESCRIPTION OF THE DRAWINGS

In order to clearly illustrate the technical solution of the embodiments of the present disclosure, the drawings of the embodiments will be briefly described in the following; it is obvious that the described drawings are only related to some embodiments of the present disclosure and thus are not limitative of the present disclosure.

FIG. 3b is a schematic diagram of resistance distribution from points on the gate line to both ends of the gate line as shown in FIG. 3a;

FIG. 4b is an enlarged schematic diagram of a plurality of first connection portions arranged in a row direction in FIG. 4a;

DETAILED DESCRIPTION

In order to make objects, technical details and advantages of the embodiments of the present disclosure apparent, the technical solutions of the embodiments of the present disclosure will be described in a clearly and fully understandable way in connection with the drawings related to the embodiments of the present disclosure. It is obvious that the described embodiments are just a part but not all of the embodiments of the present disclosure. Based on the described embodiments herein, those skilled in the art can obtain other embodiment(s), without any inventive work, which should be within the scope of the present disclosure.

Unless otherwise specified, the technical terms or scientific terms here should be of general meaning as understood by those ordinarily skilled in the art. In the disclosure, words such as "first", "second" and the like do not denote any order, quantity, or importance, but rather are used for distinguishing different components. Words such as "include" or "comprise" and the like denote that elements or objects appearing before the words of "include" or "comprise" cover the elements or the objects enumerated after the words of "include" or "comprise" or equivalents thereof, not exclusive of other elements or objects. Words such as "up", "down", "left", "right" and the like are only used for expressing relative positional relationship, when the absolute position is described object is changed, the relative positional relationship may also be correspondingly changed.

Figure 1:
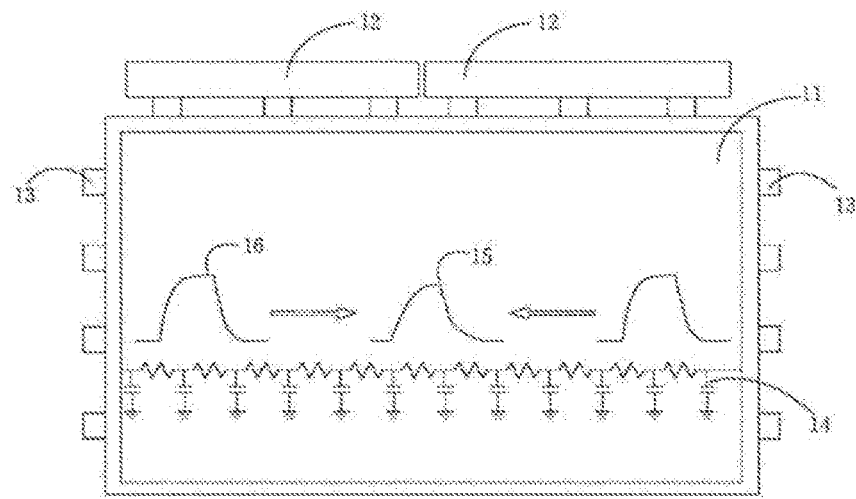
FIG. 1 is a schematic diagram of waveform of a scanning signal of a display panel.

FIG. 1 is a schematic diagram of waveform of a scanning signal of a display panel. As shown in FIG. 1, a display panel 11 displays as driven by data drivers 12 and scan drivers 13 located around it. Scanning signals of the respective scanning lines are input by the scan drivers 13 connected with both ends of the scanning lines, to control turning-on of thin film transistors (TFT) connected with the scanning lines, so that the data drivers 12 can input voltage signals required for displaying a picture into pixel electrodes 14 of the display panel 11 through the thin film transistors, so as to implement display of the display panel 11.

In research, the inventors of the present application found that: due to resistance-capacitance delay (RC delay) of the signal of the scanning line, a waveform of the scanning signal input to the scanning line is distorted; that is, when the scanning signal normal original waveform input to both ends of the scanning lines is transmitted to the middle of the scanning line, the scanning signal gradually decrease due to influence of the RC Delay of the scanning line. When the scanning signal is transmitted to a middle portion of the scanning line, a degree of decrease is particularly serious, resulting in a decrease in a charging rate of the pixel electrode 14 located at a middle position of the display panel 11, so that a voltage 15 of the pixel electrode 14 located at the middle position of the display panel 11 is lower than a voltage 16 of the pixel electrodes 14 located on both sides of the display panel 11, causing brightness of a middle region of the display panel 11 to be lower than brightness of regions on both sides; that is, a phenomenon of "whitening on both sides" occurs on the display panel 11, so as to affect uniformity of brightness of the display panel 11.

In a display region of the array substrate, the gate lines (i.e., the scanning line) and the data lines generally adopts conductive metal wires; however, the metal wire not only has resistance, but also inevitably has overlapping regions with other conductive layers. Due to the insulating layer between two electrical conductors in the overlapping region, a capacitance presents. With respect to a liquid crystal display screen, when the RC constant is relatively large, undercharging of a pixel will be caused, so that image quality of an image will be degraded, brightness will be uneven; besides, problems such as relatively large power consumption and poor local heat dissipation of the display panel will also be caused.

Figure 2:
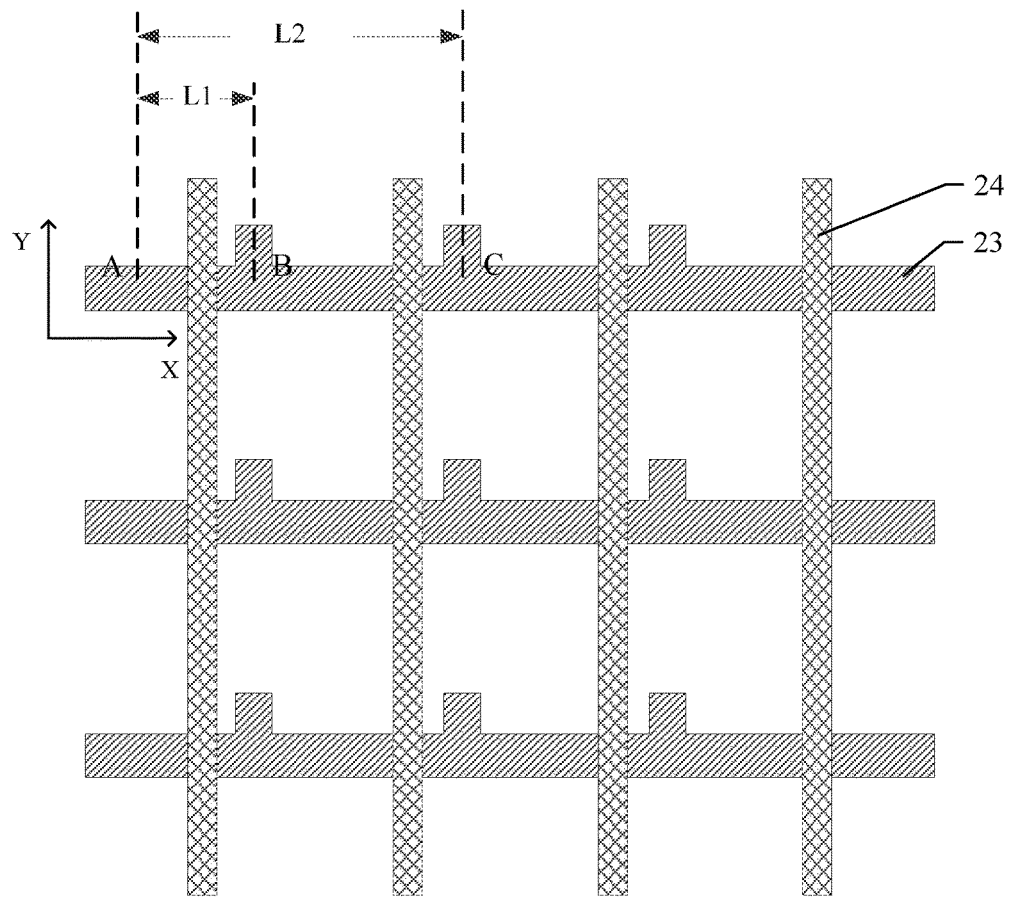
FIG. 2 is a partial schematic diagram of an array substrate.

FIG. 2 is a partial schematic diagram of an array substrate. As shown in FIG. 2, electrode lines extending in an X direction are a gate lines 23, electrode lines extending in a Y direction are data lines 24, and a plurality of data lines 24 and a plurality of gate lines 23 are arranged intersecting with each other, so as to divide the region into a plurality of pixel units. Here, with a case where an edge of the array substrate in an extension direction opposite to the X direction in FIG. 2 (i.e., a position of point A in FIG. 2) is a left edge of the array substrate as an example, A, B, and C are three points of the gate line 23. A distance between A and B is L1, a distance between A and C is L2, resistivity of the gate line 23 is P, and a cross-sectional area of the gate line 23 is S. Thickness of the gate line 23 in a general array substrate is even, that is, when a cross-sectional area S of the gate line 23 is constant, a resistance R(AB) between A and B, R(AB)=P·L1/S, and a resistance R(AC) between A and C, R(AC)=P·L2/S; from the above-described structure, it can be known that, in a region from the left edge of the array substrate to the middle of the array substrate in the X direction, a resistance R between any one point of the gate line 23 to the left edge is directly proportional to a distance from the point to the left edge.

It is assumed that R=K1·L (where K1 is a constant). Effects of other coupling capacitances on the signal delay of the gate line are ignored here, only a coupling capacitance between the gate line and a common electrode in the pixel unit is considered; and when an area of an overlapping portion between the gate line and the common electrode in a certain pixel unit remains constant, it can be considered that a coupling capacitance in an RC constant between the gate line in the display region and the common electrode is fixed, that is, the coupling capacitance C of the a overlapped portion of the common electrode in the pixel unit and the gate line is fixed. Then, corresponding to a gate electrode of a certain pixel unit in the display region, the RC constant is directly proportional to a resistance R of the metal wire between the gate electrode and a scan driver closer to the gate electrode (in an extension direction of the gate line), that is, the RC constant of the gate electrode here is directly proportional to the distance L between the gate electrode here and the scan driver closer to the gate electrode (in the extension direction of the gate line), so that delay of the scanning signal arriving to the display region will increase as the distance of the gate electrode from the scan driver increases.

Similarly, in a region from the edge of the array substrate (i.e., a right end of the array substrate) to the middle of the array substrate in an extension direction the same as the X direction, the resistance R from the point on the gate line 23 to the right edge is also directly proportional to the distance between the point to the right edge.

Figure 3A:
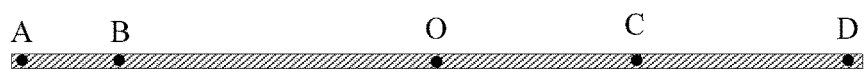
FIG. 3a is a schematic diagram of a gate line.
Figure 3B:
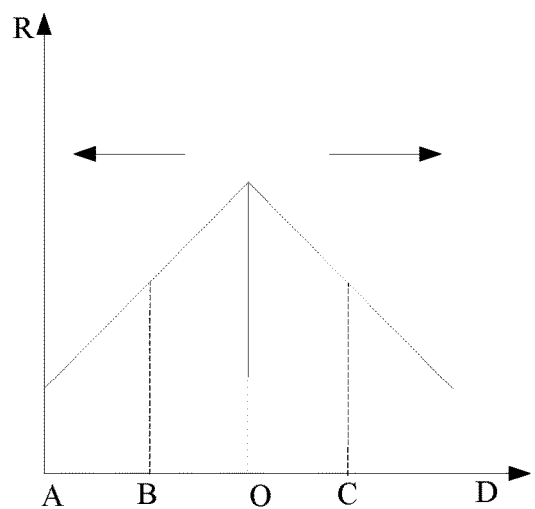

FIG. 3a is a schematic diagram of a gate line, and FIG. 3b is a schematic diagram of resistance distribution from points on the gate line to both ends of the gate line as shown in FIG. 3a. It is noted that, both ends of the gate line are signal input ends, that is, both ends of the gate line are connected with one gate driver. As shown in FIG. 3a and FIG. 3b, for example, point A located on the gate line is a left signal input end of the gate line, point D located on the gate line is a right signal input end of the gate line, and point O located on the gate line is a middle point of the gate line. In the extension direction of the gate line, as to the point B located in a region between point A and point O, the resistance R of the gate line at the point B is gradually increases as the distance from the point B to the signal input end (i.e., point A) closest to the point B increases; when point B is located at the middle point O of the gate line, that is, in the extension direction of the gate line, when point B is located in the middle position of the array substrate, the resistance value R of the gate line in the position where point B is located is the maximum. Similarly, in the extension direction of the gate line, as to the point C located in a region between point D and point O, the resistance R of the gate line at the point C is also gradually increases as the distance from the point C to the signal input end (i.e. point D) closest to the point C increases; when point C coincides with point O, that is, in the extension direction of the gate line, point C is located in the middle of the array substrate, the resistance value R of the gate line in a position where point C is located is the maximum. As shown in FIG. 3b, in directions from point O on the gate line to point A and point D on both sides, the resistance value R of the gate line gradually decreases. It should be noted that, a form of the gate line is not limited to the form shown in FIG. 3a, and may also be two parts of gate lines that is disconnected at point O, an end of each gate line closer to the edge of the array substrate is a signal input end. In this case, the two parts of gate lines may work as a whole, that is, without affecting a display effect of a center position of the display region; in this case, the schematic diagram of resistance distribution from points on the two parts of gate lines working as a whole to an edge region of the array substrate may still be approximated as shown in FIG. 3b.

Embodiments of the present disclosure provide an array substrate and a fabrication method thereof, and a display device. The array substrate includes a base substrate; a plurality of pixel units arranged in a matrix in a row direction and a column direction; each pixel unit including a common electrode, and common electrodes of adjacent pixel units in the column direction being electrically connected through a first connection portion; a first signal line located on the base substrate and extending in the row direction, and the first signal line being located between the adjacent pixel units in the column direction, and the first connection portion at least partially overlapping with the first signal line, wherein, a total area of the first connection portion between the common electrodes of every two pixel units overlapping with the first signal line is a first overlapping area, at least one end of the first signal line is a first signal input end, and the first overlapping area decrease as minimum distances from the first connection portions to the first signal input end increases in the row direction. With the above-described structure, signal delay caused by increase of the resistance value of the metal signal line from one side of the base substrate to the center of the base substrate or to the other side of the base substrate opposite thereto in the row direction is compensated, thus improving display unevenness of the display panel.

The array substrate and the fabrication method thereof, and the display device provided by the embodiments of the present disclosure will be described below in conjunction with the accompanying drawings.

Embodiment One

Figure 4A:
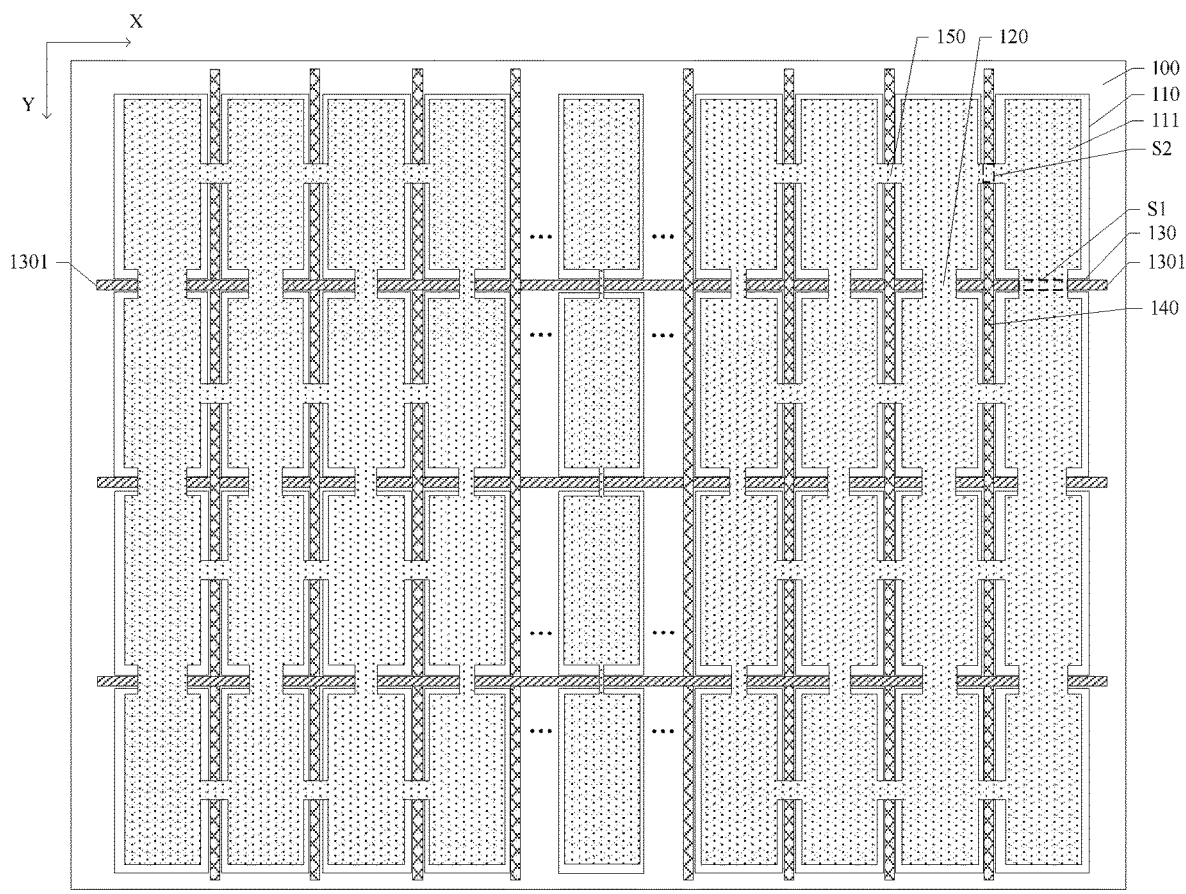
FIG. 4a is a partial schematic diagram of an array substrate provided by an embodiment of the present disclosure.

This embodiment provides an array substrate, and FIG. 4a is a partial schematic diagram of the array substrate provided by the embodiment of the present disclosure. As shown in FIG. 4a, the array substrate includes a base substrate 100, a plurality of pixel units 110 arranged in a matrix in a row direction and a column direction, and a first signal line 130 located on the base substrate 100 and extending in the row direction. In this embodiment, it is illustrated with a case where the row direction is an X direction shown in the diagram, and the column direction is a Y direction shown in the diagram as an example; this embodiment includes but is not limited thereto; for example, the row direction may also be the Y direction shown in the diagram, and the column direction is the X direction shown in the diagram. Each pixel unit 110 includes a common electrode 111 (i.e., a whole-side block electrode located in the pixel unit 110 in the diagram), and the common electrodes 111 of the adjacent pixel units 110 in the Y direction are electrically connected through a first connection portion 120. The first signal line 130 is located between the adjacent pixel units 110 in the Y direction, and the first connection portion 120 and the first signal line 130 at least partially overlap in a direction perpendicular to the base substrate 100.

For example, as shown in FIG. 4a, in the Y direction, a total area of the first connection portion 120 between common electrodes 111 of every two pixel units 110 overlapping with the first signal line 130 is a first overlapping area S1, i.e., a region enclosed by a dotted line located on the first connection portion 120 in the diagram. Here, the "first overlapping area S1" refers to the total area of the entire of the first connection portion 120 between common electrodes 111 of every two pixel units 110 and overlapping with the first signal line 130.

For example, as shown in FIG. 4a, from one side of the base substrate 100 to the center of the base substrate 100 in the X direction, the first overlapping areas S1 gradually decrease; that is, both ends of the first signal line 130 are connected with the scan driver, that is, the first signal line 130 includes two first signal input ends 1301 (both ends of the first signal line input a same signal), the first overlapping areas S1 decrease as the minimum distances of the first connection portions 120 where the first overlapping area S1 is located to the first signal input end 1301 increase in the X direction. Here, the "minimum distance" refers to a relatively smaller one of the distances of the first connection portion 120 to the two first signal input ends 1301.

It should be noted that, in this embodiment, it is illustrated with a case where the both ends of the first signal line are the first signal input ends as an example, that is, it is illustrated with a case where both ends of the first signal line are connected with one signal driver, to respectively input driving signals from both ends of the first signal line to the middle as an example. This embodiment is not limited thereto; for example, it is also possible that one end of the first signal line is the first signal input end, and then the first overlapping areas decrease as the distances of the first connection portions to the first signal input end increase in the row direction.

For example, it is illustrated with one first signal line 130 as an example, with a middle point of the first signal line 130 as a symmetric center, the first overlapping areas S1 of the first signal line 130 and the first connection portions 120 sequentially arranged from edges of both sides of the first signal line 130 to the middle point of the first signal line 130 gradually decrease in the X direction. Here, the edge of the base substrate 100 in the X direction is the edge of the first signal line 130 in the X direction. By the above-described structure, it is possible to compensate for signal delay caused by gradual increase of the resistance value of the metal signal line from the edge of a left (right) side of the base substrate to the center position of the base substrate in a direction parallel to the X direction, so as to improve a phenomenon of display unevenness of the display panel caused by resistance-capacitance delay (RC delay).

For example, as shown in FIG. 4a, from the edge of the left (right) side of the base substrate 100 to the center position of the base substrate in the X direction, the first overlapping area S1 is inversely proportional to the distance of the first connection portion 120 where the first overlapping area S1 is located to the edge of the left (right) side of the base substrate 100; that is, in the X direction, the first overlapping area S1 is inversely proportional to a minimum distance from the first connection portion 120 where the first overlapping area S1 is located to the first signal input end 1301.

Figure 4B:
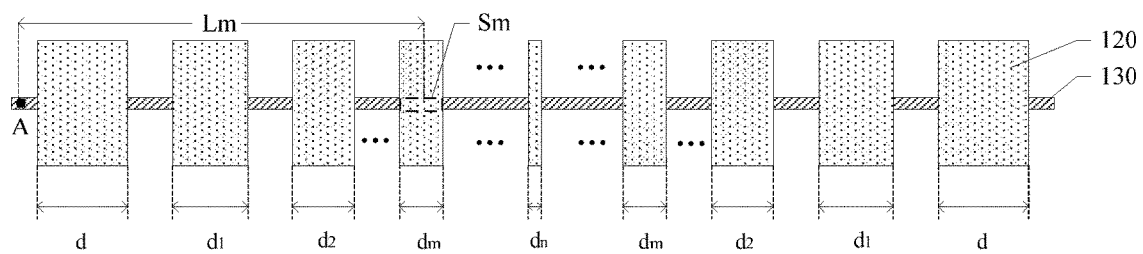

For example, FIG. 4b is an enlarged schematic diagram of a plurality of first connection portions arranged in the row direction in FIG. 4a; as shown in FIG. 4b, a distance from any first connection portion M on the first signal line 130 to the edge A of the left side of the first signal line 130 is Lm, then the resistance of the first connection portion M from the edge A of the left side of the first signal line 130 is Rm=K1·Lm (where K1 is a constant). It should be noted that, the "first connection portion M" here is located between the edge A of the left side of the first signal line 130 and the middle point of the first signal line 130.

For example, with the middle point of the first signal line 130 as the symmetric center, overlapping dimensions of the plurality of first connection portions 120 arranged from the edge on the left (right) side of the first signal line 130 to the symmetric center of the first signal line 130 in the X direction is sequentially d, d1 . . . dm . . . dn, where, the overlapping dimension of the first connection portion M with the first signal line 130 in the X direction is dm.

In this embodiment, when only the coupling capacitance between the first connection portion 120 and the first signal line 130 is considered, it can be known from a capacitance calculation formula $C=\varepsilon S/4\pi kd$ that, the coupling capacitance between the first connection portion M and the first signal line 130 is $C=K2\cdot Sm$, where K2 is a constant, which is related to a dielectric constant and a vertical distance between the first connection portion M and the first signal line 130; and Sm is an area of the overlapping portion between the first connection portion M and the first signal line 130, i.e., the first overlapping area S1.

For example, the RC constant between the first connection portion M and the first signal line 130 may be expressed as $RC=K1\cdot K2\cdot Lm\cdot Sm$. When the dimension of the first signal line 130 in the Y direction is constant, the area Sm of the overlapping portion between the first connection portion M and the first signal line 130 is directly proportional to an overlapping dimension dm of the first connection portion M and the first signal line 130 in the X direction. In this embodiment, by changing the dm of the first connection portion M, Sm is inversely proportional to Lm, i.e., $Sm=K3/Lm$ (K3 is a constant); that is, from the left (right) edge of the base substrate 100 to the center of the base substrate 100 in the X direction, the first overlapping area S1 decreases in an inverse proportion to the distance L from the first connection portion 120 where the first overlapping area S1 is located to the left (right) edge of the base substrate 100. From $Sm=K3/Lm$, it can be derived that the RC constant between the first connection portion M and the first signal line 130 is $RC=K1\cdot K2\cdot K3$.

Therefore, under the premise that only the coupling capacitance between the first connection portion 120 and the first signal line 130 is considered, the RC constants on the first signal line 130 of the entire display region are equal, and thus, it is possible to compensate for signal delay caused by increase of the resistance value of the metal signal line from the edge of the base substrate to the center of the base substrate in the row direction, so as to improve a phenomenon of display unevenness of the display panel caused by RC delay.

For example, as shown in FIG. 4a, the array substrate further includes a second signal line 140 extending in the Y direction located on the base substrate 100, and a second connection portion 150 configured to connect the common electrodes 111 of adjacent pixel units 110 in the X direction. The second signal line 140 is located between adjacent pixel units 110 in the X direction, and the second connection portion 150 and the second signal line 140 at least partially overlap in the direction perpendicular to the base substrate 100. In the X direction, the total area of the second connection portion 150 between common electrodes 111 of every two pixel units 110 overlapping with the second signal line 140 is a second overlapping area S2, i.e., a region enclosed by a dotted line located on the second connection portion 150 in the diagram. Here, the "second overlapping area S2" refers to the total area of the entire of the second connection portion 150 between the common electrodes 111 of every two pixel units 110 and overlapping with the second signal line 140.

For example, in an example as shown in FIG. 4a, all first overlapping areas S1 in each column extending in the Y direction are equal; the first overlapping areas S1 arranged in the X direction take the middle point of the first signal line 130 as a symmetrical center, and the first overlapping areas S1 gradually increase, in extension directions from the middle position of the first signal line 130 to the edges of the left side and the right side. Respective second overlapping areas S2 located on the base substrate 100 are all equal.

Figure 5:
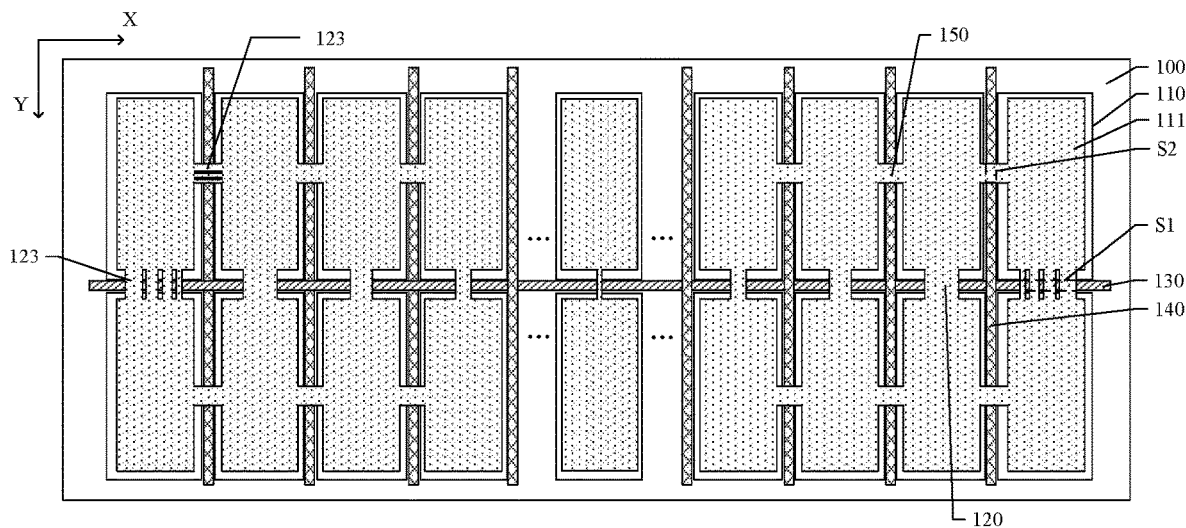
FIG. 5 is a partial schematic diagram of the array substrate provided by another example of the embodiment of the present disclosure.

For example, FIG. 5 is a partial schematic diagram of the array substrate provided by another example of this embodiment of the present disclosure; as shown in FIG. 5, the first connection portion 120 between common electrodes 111 of at least one pair of pixel units 110 includes a plurality of sub-connection portions 123 arranged in the X direction; in this embodiment, two is taken as an example, but it is not limited thereto, and there may be more.

For example, as shown in FIG. 5, the total area of the plurality of sub-connection portions 123 between common electrodes 111 of the at least one pair of pixel units 110 overlapping with the first signal line 130 is the first overlapping area S1 (FIG. 5 schematically shows the leftmost pair and the rightmost pair); that is, the total area of the entire of the first connection portion 120 between the common electrodes 111 of each two pixel units 110 overlapping with the first signal line 130 is S1.

For example, as shown in FIG. 5, the second connection portion 150 between the common electrodes 111 of at least one pair of pixel units 110 includes a plurality of sub-connection portions 123 arranged in the Y direction, and the total area of the plurality of sub-connection portions 123 between the common electrodes 111 of each two pixel units 110 overlapping with the second signal line 140 is the second overlapping area. Therefore, at least one of the first connection portion 120 and the second connection portion 150 between the common electrodes 111 of at least one pair of pixel units 110 in this embodiment includes a plurality of sub-connection portions 123.

For example, the first signal line 130 includes a gate line, and the second signal line 140 includes a data line. This embodiment includes, but is not limited thereto. For example, it may also be that the first signal line includes a data line, and the second signal line includes a gate line.

For example, a material of the common electrode 111 may include a transparent conductive material, for example, may include combination of indium tin oxide (ITO), indium zinc oxide (IZO), zinc oxide (ZnO), indium oxide ($In_2O_3$), indium gallium oxide (IGO) or at least one of them, which will not be limited in this embodiment.

For example, the material of the common electrode may include an opaque conductive material, and the like.

For example, the material of the common electrode 111 is the same as the material of at least one of the first connection portion 120 and the second connection portion 150.

For example, the material of the common electrode 11l is the same as the material of the first connection portion 120 and the second connection portion 150; in a fabrication procedure, patterns of the common electrode 111, the first connection portion 120 and the second connection portion 150 may be simultaneously formed by one patterning process, so as to save a process.

Embodiment Two

Different from Embodiment One, in the array substrate provided by this embodiment, the second overlapping areas gradually decrease from the edge of the base substrate to the center of the base substrate in the column direction; that is, both ends of the second signal line are the second signal input ends (both ends of the second signal line input a same signal), the second overlapping areas decrease as minimum distances of the second connection portions 120 to the second signal input end increase in the column direction. Here, the "minimum distance" refers to a relatively smaller one of the distances of the second connection portion to the two second signal input ends.

It should be noted that, in this embodiment, it is illustrated with a case where both ends of the second signal line are the second signal input end as an example; that is, it is illustrated with a case where both ends of the second signal line are connected with one signal driver, to respectively input driving signals from the both ends of the second signal line to the middle as an example. This embodiment is not limited thereto; for example, it is also possible that one end of the second signal line is the second signal input end, and then the second overlapping areas in the column direction decrease as the distances of the second connection portions to the second signal input end increase.

Figure 6:
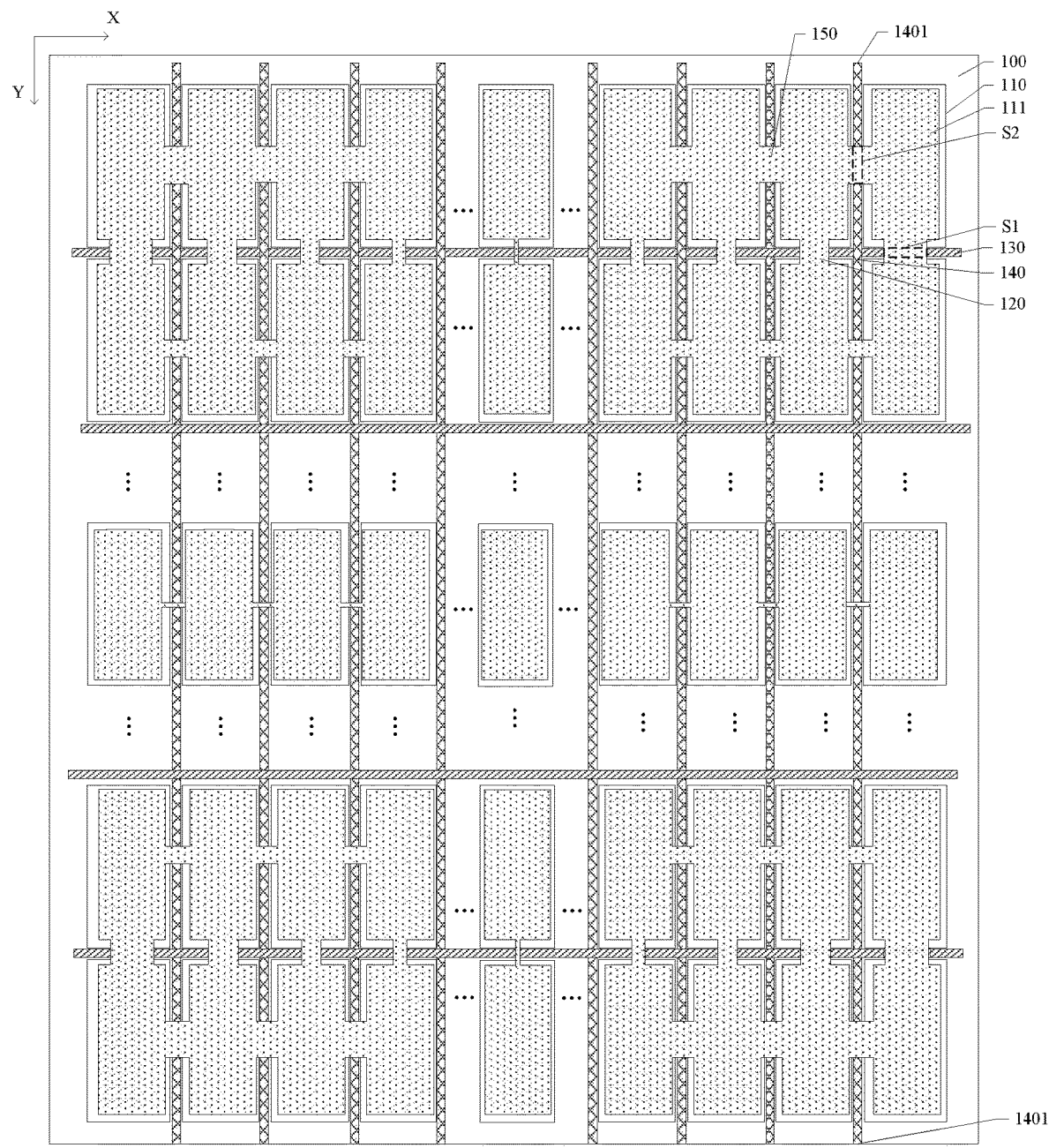
FIG. 6 is a partial schematic diagram of an array substrate provided by another embodiment of the present disclosure.

FIG. 6 is a partial schematic diagram of the array substrate provided by this embodiment; as shown in FIG. 6, both ends of a second signal line 140 are the second signal input ends 1401, and the second overlapping areas S2 gradually decrease from the edge of the base substrate 100 to the center of the base substrate 100 in the Y direction.

For example, it is illustrated with one second signal line 140 as an example, with the middle point of the second signal line 140 as a symmetric center, the second overlapping areas S2 of the second connection portions 150 sequentially arranged from the second signal input end 1401 on both sides of the second signal line 140 to the middle point of the second signal line 140 in the Y direction and overlapping with the second signal line 140 gradually decrease. Here, the edge of the base substrate 100 in the Y direction is the edge of the second signal line 140 in the Y direction.

For example, from an upper (lower) edge of the base substrate 100 in the Y direction to the center of the base substrate 100, the second overlapping area S2 is inversely proportional to the distance of the second connection portion 150 where the second overlapping area S2 is located to the upper (lower) edge of the base substrate 100. When only the coupling capacitance between the second connection portion 150 and the second signal line 140 is considered, the RC constants on the second signal line 140 of the entire display region are equal, and thus, it is possible to compensate for signal delay caused by increase of the resistance value of the metal signal line from the edge of the base substrate to the center of the base substrate in the column direction, so as to improve a phenomenon of display unevenness of the display panel caused by RC delay.

For example, in an example as shown in FIG. 6, all the second overlapping areas S2 in each row extending in the X direction are equal. The second overlapping areas S2 arranged in the Y direction take the middle point of the second signal line 140 as a symmetrical center, and the second overlapping areas S2 gradually increase, in extension directions from the middle position of the second signal line 140 to the edges of the upper side and the lower side. The first overlapping area S1 follows a variation rule provided in Embodiment One.

In addition, the embodiment according to the present disclosure is not limited to the above-described exemplary structure. For example, it is also possible that only the second overlapping areas of the second signal line are variable in the column direction, and the first overlapping areas of the first signal line are constant in the row direction.

For example, that the first overlapping areas gradually decrease from the edge to the center in the row direction, includes a case where the first overlapping areas corresponding to some adjacent first connection portions are equal; and that the second overlapping areas gradually decrease from the edge to the center in the row direction, includes a case where the second overlapping areas corresponding to some adjacent second connection portions are equal.

Embodiment Three

Figure 7:
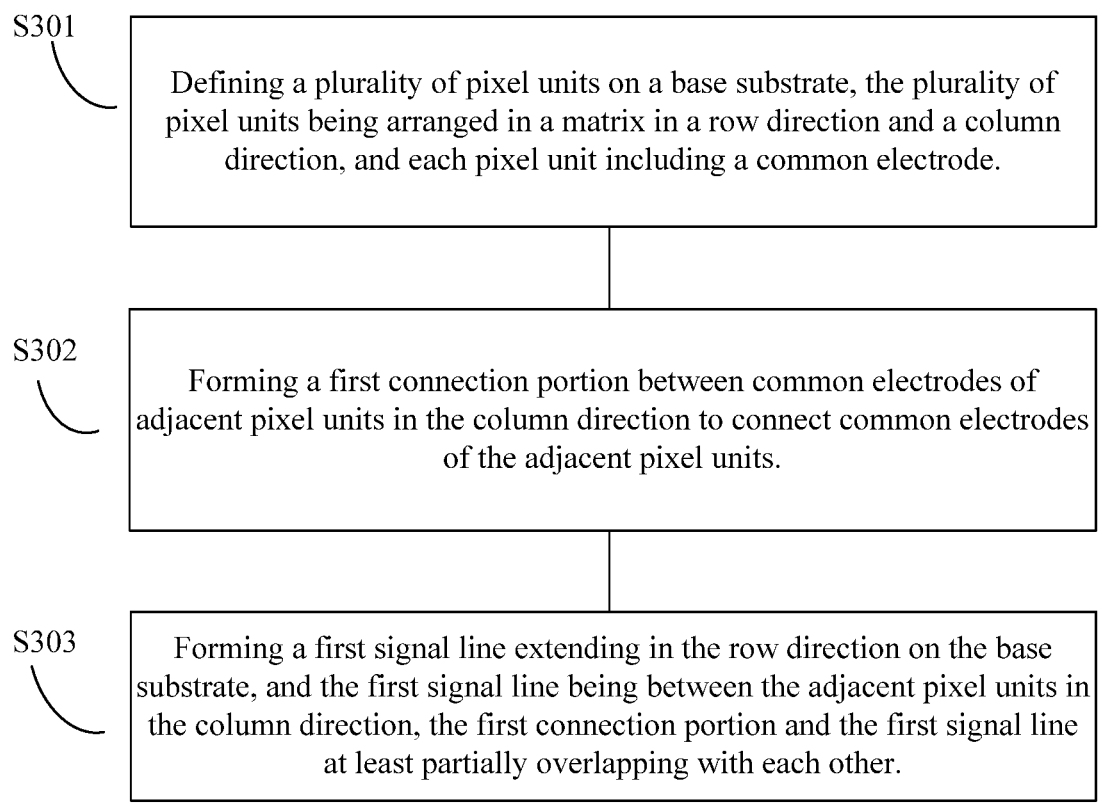
FIG. 7 is a schematic diagram of specific steps of a fabrication method of an array substrate provided by an embodiment of the present disclosure.

This embodiment provides a fabrication method of an array substrate, specific steps of the fabrication method are shown in FIG. 7, and the specific steps are as follows:

S301: defining a plurality of pixel units on a base substrate, the plurality of pixel units being arranged in a matrix in a row direction and a column direction, and each pixel unit including a common electrode.

S302: forming a first connection portion between the common electrodes of adjacent pixel units in the column direction to connect the common electrodes of the adjacent pixel units.

S303: forming a first signal line extending in the row direction on the base substrate, the first signal line being between the adjacent pixel units in the column direction, the first connection portion and the first signal line at least partially overlapping with each other.

In this embodiment, the total area of the first connection portion between the common electrodes of every two pixel units overlapping with the first signal line is a first overlapping area; herein, the "first overlapping area" refers to the total area of the entire of the first connection portion between the common electrodes of every two pixel units and overlapping with the first signal line.

For example, in the column direction, the first connection portion between common electrodes of at least one pair of pixel units includes a plurality of sub-connection portions arranged in the row direction, and the total area of the plurality of sub-connection portions between common electrodes of at least one pair of pixel units and overlapping with the first signal line is the first overlapping area.

In this embodiment, the first overlapping areas gradually decrease from the edge of the base substrate to the center of the base substrate in the row direction; that is, both ends of the first signal line are first signal input ends (both ends of the first signal line input a same signal), the first overlapping areas decrease as the minimum distances of the first connection portions where the first overlapping area is located to the first signal input end increase in the row direction. Here, the "minimum distance" refers to a relatively smaller one of distances of the first connection portion to the two first signal input ends.

It should be noted that, in this embodiment, it is illustrated with a case where both ends of the first signal line are the first signal input ends as an example, that is, it is illustrated with a case where both ends of the first signal line are respectively connected with one signal driver, to input driving signals from both ends of the first signal line to the middle as an example. This embodiment is not limited thereto; for example, it is also possible that one end of the first signal line is the first signal input end, and then the first overlapping areas decrease as the distances of the first connection portions to the first signal input end increase in the row direction.

For example, from the left (right) edge of the base substrate to the center of the base substrate in the row direction, the first overlapping areas decrease in an inverse proportion to the distance of the first connection portion where the first overlapping area is located to the left (right) edge of the base substrate; that is, in the row direction, the first overlapping area is inversely proportional to the minimum distance from the first connection portion where the first overlapping area is located to the first signal input end. With the above-described structure, it is possible to compensate for signal delay caused by gradual increase of a resistance value of a metal signal line from edges of both sides of the base substrate to the center of the base substrate in the row direction, so as to improve a phenomenon of display unevenness of the display panel caused by resistance-capacitance delay (RC delay).

For example, the fabrication method of the array substrate provided by this embodiment further includes: forming a second signal line extending in the column direction on the base substrate, and the second signal line being between adjacent pixel units in the row direction; forming a second connection portion between common electrodes of adjacent pixel units to connect the common electrodes of the adjacent pixel units in the row direction, the second connection portion and the second signal line at least partially overlapping with each other. Here, the total area of the second connection portion between common electrodes of every two pixel units overlapping with the second signal line is a second overlapping area; here, the "second overlapping area" refers to the total area of the entire of the second connection portion between common electrodes of every two pixel units and overlapping with the second signal line.

For example, in the row direction, the second connection portion between the common electrodes of at least one pair of pixel units includes a plurality of sub-connection portions arranged in the column direction, and the total area of the plurality of sub-connection portions between the common electrodes of at least one pair of pixel units overlapping with the second signal line is the second overlapping area.

For example, in one example of this embodiment, all the first overlapping areas in each column extending in the column direction are equal; the first overlapping areas arranged in the row direction take the middle point of the first signal line as a symmetrical center, and the first overlapping areas gradually increase in extension directions from the middle position of the first signal line to the edges of the left side and the right side. The respective second overlapping areas locate on the base substrate are all equal.

Therefore, under the premise that only the coupling capacitance between the first connection portion and the first signal line is considered, the RC constants on the first signal line of the entire display region are equal, and thus, it is possible to compensate for signal delay caused by increase of the resistance value of the metal signal line from the edge of the base substrate to the center of the base substrate in the row direction, so as to improve the phenomenon of display unevenness of the display panel caused by RC delay.

For example, in one example of this embodiment, all the second overlapping areas in each row extending in the row direction are equal, the second overlapping areas arranged in the column direction take the middle point of the second signal line as a symmetrical center, and the second overlapping areas gradually increase in extension directions from the middle position of the second signal line to edges of the upper side and the lower side; that is, both ends of the second signal line are second signal input ends (both ends of the second signal line input a same signal), the second overlapping areas decrease as the minimum distances of the second connection portions to the second signal input end increase in the column direction. The respective first overlapping areas located on the base substrate are all equal.

Therefore, under the premise that only the coupling capacitance between the second connection portion and the second signal line is considered, the RC constants on the second signal line of the entire display region are equal, and thus, it is possible to compensate for signal delay caused by increase of the resistance value of the metal signal line from the edge of the base substrate to the center of the base substrate in the column direction, so as to improve the phenomenon of display unevenness of the display panel caused by RC delay.

It should be noted that, in this embodiment, it is illustrated with a case where both ends of the second signal line are the second signal input ends as an example, that is, it is illustrated with a case where both ends of the second signal line are respectively connected with one signal driver, to input driving signals from both ends of the second signal line to the middle as an example. This embodiment is not limited thereto; for example, it is also possible that one end of the second signal line is the second signal input end, and then the second overlapping areas decrease as the distances of the second connection portions to the second signal input end increase in the column direction.

For example, in one example of this embodiment, the first overlapping areas arranged in the row direction take the middle point of the first signal line as a symmetrical center, and the first overlapping areas gradually increase in extension directions from the middle position of the first signal line to the edges of the left side and the right side; the second overlapping areas arranged in the column direction take the middle point of the second signal line as a symmetrical center, and the second overlapping areas gradually increases in extension directions from the middle position of the second signal line to the edges of the upper side and the lower side.

Therefore, under the premise that only the coupling capacitance between the first connection portion and the first signal line, and the coupling capacitance between the second connection portion and the second signal line is considered, the RC constants on the first signal line and the second signal line of the entire display region are equal, and thus, it is possible to compensate for signal delay caused by increase of the resistance value of the metal signal line from the edge of the base substrate to the center of the base substrate in the row/column direction, so as to improve the phenomenon of display unevenness of the display panel caused by RC delay.

For example, the first signal line includes a gate line, and the second signal line includes a data line. This embodiment includes, but is not limited thereto; for example, it may also be that the first signal line includes a data line, and the second signal line includes a gate line.

For example, at least one of the common electrode as well as the first connection portion and the second connection portion is simultaneously formed by one patterning process.

For example, patterns of the common electrode, the first connection portion and the second connection portion may be simultaneously formed by one patterning process during a fabrication process, so that it is possible to save process steps.

Embodiment Four

This embodiment provides a display device, comprising any array substrate provided by the above-described embodiments. In the display device with the array substrate, first and/or second overlapping areas of first and/or second connection portions between common electrodes of every two pixel units and overlapping with first and/or second signal line, from the edge of the array substrate to the center of the array substrate, gradually decrease in the row and/or the column direction, which compensates for signal delay caused by increase of a resistance value of a metal signal line from the edge of the array substrate to the center of the array substrate in the row and/or the column direction, so as to improve display unevenness of the display device.

It should be noted that, in this embodiment, it is illustrated with a case where both ends of the first and/or the second signal line are the first and/or the second signal input ends as an example, that is, it is illustrated with a case where both ends of the first and/or the second signal line are connected with one signal driver, to input driving signals from both ends of the first and/or the second signal line to the middle as an example. This embodiment is not limited thereto; for example, it is also possible that one end of the first and/or the second signal line is the first and/or the second signal input end, and then the first and/or the second overlapping areas decrease as the distances of the first and/or the second connection portions to the first and/or the second signal input end increase in the row and/or the column direction.

For example, the display device may be a liquid crystal display device, an organic light-emitting diode (OLED) display device and other display devices, as well as a television, a digital camera, a mobile phone, a watch, an e-book, a laptop, a tablet personal computer, a navigator, and any other product or component having a display function including the display device, and this embodiment is not limited thereto.

Several points below need to be explained:

(1) Unless otherwise specified, in the embodiments of the present disclosure and the accompanying drawings, a same reference sign represents a same meaning.

(2) In the accompanying drawings and the embodiments of the present disclosure, only the structures related to the embodiments of the present disclosure are involved, and for other structures, normal design may be referred to.

(3) For the sake of clarity, in the accompanying drawings for describing the embodiments of the present disclosure, layers or regions are exaggerated. It can be understood that, when an element such as a layer, a film, a region, or a substrate is referred to as being "on" or "under" another element, it can be "directly" located "on" or "under" another element, or there may be an intermediate element.

The above are only specific embodiments of the present disclosure, but the scope of the present disclosure is not limited thereto, and any skilled in the art, within the technical scope disclosed by the present disclosure, can easily think of variations or replacements, which should be covered within the protection scope of the present disclosure. Therefore, the scope of the present disclosure should be the scope of the following claims.

The invention claimed is:

1. An array substrate, comprising:
a base substrate;
a plurality of pixel units, arranged in a matrix in a row direction and a column direction; each of the pixel units including a common electrode, and the common electrodes of adjacent pixel units in the column direction being electrically connected through a first connection portion;
a first signal line, located on the base substrate and extending in the row direction, and located between the adjacent pixel units in the column direction, the first connection portion and the first signal line at least partially overlapping with each other,
wherein, a total area of the first connection portion between the common electrodes of every two of the pixel units overlapping with the first signal line is a first overlapping area, at least one end of the first signal line is a first signal input end, and the first overlapping areas decrease as minimum distances from the first connection portions to the first signal input end increase in the row direction, so that coupling capacitances between the first signal line and the first connection portions decrease as minimum distances from the first connection portions to the first signal input end increase in the row direction,
wherein the coupling capacitance between the first signal line and the first connection portion is $C=K2 \cdot Sm$, where $K2$ is a constant which is related to a dielectric constant and a vertical distance between the first connection portion and the first signal line, and $Sm$ is an area of the first overlapping area.

2. The array substrate according to claim 1, wherein, the first overlapping area is inversely proportional to the minimum distance from the first connection portion to the first signal input end in the row direction.

3. The array substrate according to claim 1, further comprising:
- a second signal line, located on the base substrate and extending in the column direction, and located between the adjacent pixel units in the row direction;
- a second connection portion, configured to connect the common electrodes of adjacent pixel units in the row direction, the second connection portion and the second signal line at least partially overlapping with each other,
- wherein, a total area of the second connection portion between the common electrodes of every two of the pixel units overlapping with the second signal line is a second overlapping area, at least one end of the second signal line is a second signal input end, and the second overlapping areas decrease as minimum distances of the second connection portions to the second signal input end increase in the column direction.

4. The array substrate according to claim 3, wherein, one of the first signal line and the second signal line is a gate line, and the other is a data line.

5. The array substrate according to claim 3, wherein, a material of the common electrode is the same as a material of at least one of the first connection portion or the second connection portion.

6. The array substrate according to claim 3, wherein, at least one of the first connection portion or the second connection portion between the common electrodes of at least one pair of pixel units includes a plurality of sub-connection portions.

7. The array substrate according to claim 3, wherein, in the column direction, the second overlapping area is inversely proportional to the minimum distance of the second connection portion to the second signal input end.

8. A display device, comprising the array substrate according to claim 1.

9. A fabrication method of an array substrate, comprising:
- defining a plurality of pixel units on a base substrate, the plurality of pixel units being arranged in a matrix in a row direction and a column direction, and each of the pixel units including a common electrode;
- forming a first connection portion between the common electrodes of adjacent pixel units in the column direction to connect the common electrodes of the adjacent pixel units;
- forming a first signal line extending in the row direction on the base substrate, and the first signal line being between the adjacent pixel units in the column direction, the first connection portion and the first signal line at least partially overlapping with each other,
- wherein, a total area of the first connection portion between the common electrodes of every two of the pixel units overlapping with the first signal line is a first overlapping area, at least one end of the first signal line is a first signal input end, and the first overlapping areas decrease as minimum distances from the first connection portions to the first signal input end increase in the row direction, so that coupling capacitances between the first signal line and the first connection portions decrease as minimum distances from the first connection portions to the first signal input end increase in the row direction,
- wherein the coupling capacitance between the first signal line and the first connection portion is $C=K2 \cdot Sm$, where $K2$ is a constant which is related to a dielectric constant and a vertical distance between the first connection portion and the first signal line, and $Sm$ is an area of the first overlapping area.

10. The fabrication method of the array substrate according to claim 9, further comprising:
- forming a second signal line extending in the column direction on the base substrate, and forming the second signal line between the adjacent pixel units in the row direction;
- forming a second connection portion between common electrodes of the adjacent pixel units in the row direction to connect the common electrodes of the adjacent pixel units, the second connection portion and the second signal line at least partially overlapping with each other,
- wherein, a total area of the second connection portion between common electrodes of every two of the pixel units overlapping with the second signal line is a second overlapping area, at least one end of the second signal line is a second signal input end, and the second overlapping areas decrease as minimum distances of the second connection portions to the second signal input end increase in the column direction.

11. The fabrication method of the array substrate according to claim 10, wherein, at least one of the first connection portion or the second connection portion is formed with the common electrodes by one patterning process.

* * * * *